(12) United States Patent
Smith (10) Patent No.: US 7,669,417 B2
(45) Date of Patent: Mar. 2, 2010

(54) ENGINE AFTER-COOLING SYSTEM (75) Inventor: Norman John Smith, Kurwongbah (AU)

(73) Assignee: Titan Research and Innovations Pty Ltd, Victoria (AU)

( * ) Notice: Subject to any disclaimer, the term of this patent is extended or adjusted under 35 U.S.C. 154(b) by 379 days.

(21) Appl. No.: 11/878,491

(22) Filed: Jul. 25, 2007

(65) Prior Publication Data

US 2007/0261682 A1 Nov. 15, 2007

Related U.S. Application Data (63) Continuation-in-part of application No. PCT/AU2006/00107, filed on Jan. 30, 2006.

(30) Foreign Application Priority Data

Aug. 3, 2006 (AU) .............................. 2006904212
Jun. 13, 2007 (AU) .............................. 2007903177

(51) Int. Cl.
*F02B 29/04* (2006.01)
*F02B 33/00* (2006.01)
*F01P 7/02* (2006.01)
*F01P 3/12* (2006.01)

(52) U.S. Cl. ................... 60/599; 123/563; 123/41.12

(58) Field of Classification Search ........... 60/599; 123/563, 41.31, 41.12; F02B 29/04
See application file for complete search history.

(56) References Cited

U.S. PATENT DOCUMENTS

| | | | |
|---|---|---|---|
| 3,872,835 A | 3/1975 | Deutschmann | 123/41.31 |
| 4,176,630 A * | 12/1979 | Elmer | 123/41.12 |
| 4,207,848 A * | 6/1980 | Dinger et al. | 60/599 |
| 4,325,219 A | 4/1982 | Stang et al. | 60/599 |
| 4,520,767 A * | 6/1985 | Roettgen et al. | 123/41.31 |
| 4,563,983 A * | 1/1986 | Hayashi et al. | 60/599 |
| 4,688,383 A * | 8/1987 | Targa Pascual | 60/599 |
| 4,697,551 A | 10/1987 | Larsen et al. | 60/599 |
| 4,977,862 A | 12/1990 | Aihara et al. | 123/41.12 |
| 5,201,285 A | 4/1993 | McTaggart | 123/41.31 |
| 5,598,705 A | 2/1997 | Uzkan | 60/599 |
| 5,910,099 A * | 6/1999 | Jordan et al. | 60/599 |
| 6,158,399 A | 12/2000 | Ash et al. | 123/563 |
| 6,283,100 B1 * | 9/2001 | Chen et al. | 123/563 |
| 6,286,311 B1 * | 9/2001 | Chen | 60/599 |

(Continued)

FOREIGN PATENT DOCUMENTS

JP 55096320 A * 7/1980

(Continued)

*Primary Examiner*—Thai Ba Trieu
(74) *Attorney, Agent, or Firm*—Hoffman, Wasson & Gitler, P.C.

(57) ABSTRACT

An engine after-cooling system (10) comprises an after-cooler (11) for cooling compressed air which is output from a compressor for combustion by an internal-combustion engine, a heat exchanger (19) for cooling a coolant which is output from the after-cooler (11), a pump (21) for continuously pumping the coolant through the system (10), an outlet air temperature sensor (27) for sensing the temperature of the compressed air after being cooled by the after-cooler (11), a coolant temperature sensor (17) for sensing the temperature of the coolant output from the after-cooler (11), and a controller (26) for controlling the flow-rate of coolant through the system (10) in response to the sensed air and coolant temperatures.

22 Claims, 5 Drawing Sheets

U.S. PATENT DOCUMENTS

| | | | |
|---|---|---|---|
| 6,321,697 B1 | 11/2001 | Matsuda et al. | 123/563 |
| 6,491,001 B1 * | 12/2002 | Dean et al. | 123/41.31 |
| 6,561,169 B2 | 5/2003 | Sealy et al. | 123/563 |
| 7,040,303 B2 * | 5/2006 | Uzkan et al. | 123/563 |
| 7,343,743 B2 * | 3/2008 | Dismon et al. | 60/599 |
| 7,454,896 B2 * | 11/2008 | Chalgren et al. | 60/599 |
| 2009/0205590 A1 * | 8/2009 | Vetrovec | 123/41.14 |

FOREIGN PATENT DOCUMENTS

| | | | |
|---|---|---|---|
| JP | 56050215 A | * | 5/1981 |
| JP | 60093118 A | * | 5/1985 |
| WO | WO 1999/53178 A1 | | 10/1999 |

* cited by examiner

ENGINE AFTER-COOLING SYSTEM

This application is a continuation-in-part of international application PCT/AU2006/000107 filed 30 Jan. 2006 which designated the United States of America and additionally claims priority from Australian provisional patent application 2006904212 filed 3 Aug. 2006 and Australian provisional patent application 2007903177 filed 13 Jun. 2007.

FIELD OF THE INVENTION

The present invention relates generally to cooling systems and, in particular, to engine after-cooling systems for cooling the compressed air which is output from a compressor such as a turbocharger or supercharger for combustion by an internal-combustion engine.

BRIEF DISCUSSION OF THE PRIOR ART

Diesel engines often include a compressor such as a turbo-charger or supercharger for compressing inlet air prior to the air being mixed with diesel fuel and combusted. Compressing the inlet air allows more diesel fuel to be combusted during each cycle of a diesel engine and this consequently increases the amount of power which is output by the engine.

The power output and fuel consumption of many modern diesel engines are computer-controlled so that the engines comply with emission requirements. These types of engines are therefore often referred to as emission-controlled engines. If the ambient air temperature in the vicinity of such a diesel engine increases so that the temperature of the inlet air for the engine also rises, the engine is automatically de-rated by its controlling computer so that the power output of the engine is reduced. The engine is de-rated because as the temperature of the inlet air rises the compressed air output by the compressor expands and becomes less dense by volume so that the amount of diesel which can be effectively combusted per unit volume of air is thus reduced. De-rating the engine causes less diesel fuel to be injected into the cylinder combustion chamber with the air so that the desired fuel-air ratio is maintained. This means that there is both less air and less diesel being combusted during each combustion cycle of the engine and the output power of the engine is consequently reduced. De-rating the engine reduces the quantity of pollutants which are emitted by the engine but can significantly diminish the power output of the engine, particularly under heavy load.

The temperature of the compressed inlet air for a diesel engine is not only dependent on the ambient air temperature in the vicinity of the engine. When the inlet air is being compressed by a compressor such as a turbocharger or super-charger, the compression process increases the temperature of the inlet air by a significant amount. If the engine is a modern diesel engine which is able to be de-rated by its integrated computer management system, the increase in temperature caused by the compression process will usually cause the engine to de-rate so that the engine produces less power.

When diesel engines which rely on compressed inlet air are used in automotive and stationary applications the engines usually include an after-cooling system which cools the inlet air after it is compressed so as to improve engine performance. The after-cooling system includes an air-to-air after-cooler which is similar in design to a conventional water-to-air radiator and includes a plurality of cooling tubes through which the compressed inlet air passes and a plurality of cooling fins adjacent the cooling tubes so that heat from the compressed inlet air is able to be transferred to the cooling fins which in turn are able to transfer the heat to the surrounding air which flows past the cooling fins. In automotive and stationary applications the air-to-air after-cooler is typically positioned in front of the water-cooling radiator which is usually located in front of the engine.

Although after-cooling systems of the type which include an air-to-air after-cooler are effective in cooling compressed inlet air and increasing engine performance, they suffer from the deficiency that as the ambient air temperature increases the cooling efficiency of the air-to-air after-cooler decreases which results in an increase in the temperature of the compressed inlet air which is output from the after-cooler. This increase in temperature of the compressed inlet air reduces engine performance and can cause a de-rateable engine's integrated computer management system to automatically de-rate the engine's power output in response to the cooling inefficiency so that the engine will continue to meet emission requirements and regulations.

The reduction in cooling efficiency of air-to-air after-coolers as ambient air temperature increases can be overcome to a certain extent by increasing the size of such after-coolers so that greater cooling can be achieved in order to at least partially offset any increase in ambient air temperature. However, there are practical limitations to the amount by which the size of an air-to-air after-cooler can be increased. For example, the size of an air-to-air after-cooler may be limited by the amount of space which is available to accommodate the after-cooler.

The cooling efficiency of after-cooling systems can be significantly increased by using a water-to-air after-cooler to condense the compressed air instead of an air-to-air after-cooler. Water-to-air after-coolers are used with diesel marine engines such that seawater is used instead of air to cool the after-coolers. These marine after-cooling systems continuously pump fresh seawater through their after-coolers and heat exchangers instead of continuously pumping the same seawater through the after-coolers. Marine engines are able to output much more power when they employ seawater-cooled after-cooling systems instead of air-cooled after-cooling systems.

Seawater-cooled after-cooling systems are obviously not suitable for use with land-based engines. Although attempts have been made to modify existing water-to-air after-cooling systems so that they can be used with land-based engines, to the inventor's knowledge such attempts have not to date been particularly successful.

An example of a prior art water-to-air after-cooling system is disclosed in U.S. Pat. No. 4,697,551 (Larsen et al.). Larsen et al. discloses a method and apparatus for quickly adjusting the coolant flow in a tuned, low-flow coolant system to maintain the temperature of air leaving an after-cooler at a desired temperature and for maintaining the temperature of an engine block within a predetermined range during various engine loads and ambient temperatures. In particular, Larsen et al. discloses a quick-acting, proportional radiator shuttle valve for mixing hot coolant from an inlet of a radiator with cooled coolant from an outlet of the radiator for application to an after-cooler, and a quick-acting after-cooler shuttle valve for mixing cooled coolant from the outlet of the radiator with coolant from the after-cooler for application to an engine block. The operation of the radiator shuttle valve is controlled by a valve-actuating controller which controls the shuttle valve in response to the temperature of the air which is output from the after-cooler as measured by an air temperature sensor. The operation of the after-cooler shuttle valve is controlled by a valve-actuating controller which controls the after-cooler shuttle in response to the temperature of the coolant in the engine block. A pump is used to pump coolant through the radiator, after-cooler, and the engine block.

Another example of a prior art water-to-air after-cooling system is disclosed in U.S. Pat. No. 5,201,285 (McTaggart). McTaggart discloses a controlled cooling system for a turbo-charged internal combustion engine having a heat exchange radiator, liquid coolant to absorb heat from the engine, a pump to circulate coolant through the system, a fan to force air in heat exchange with the engine coolant radiator, and another radiator for the charge-air after-cooler coolant. The cooling and turbo charge system for the engine includes a temperature control valve to direct a portion of the liquid coolant discharged from the engine to the radiator and to direct a portion of the liquid coolant to bypass the radiator in response to the temperature of the liquid coolant after discharge from the engine. A liquid sub-cooler heat exchanger lowers the temperature of the liquid coolant by passing the coolant in heat exchange with forced air from the fan. A flow control valve directs a portion of the liquid coolant discharged from the radiator to the sub-cooler heat exchanger and the remainder of the liquid coolant to the engine. An after-cooler heat exchanger lowers the temperature of the combustion air discharged from the turbo compressor by passing the combustion air charge in heat exchange with the liquid coolant from the sub-cooler heat exchanger.

Yet another example of a prior art water-to-air after cooling system is disclosed in U.S. Pat. No. 4,977,862 (Aihara et al.). The Aihara et al. patent discloses an engine room-cooling control system for an engine which includes an after-cooling system. The after-cooling system includes a liquid-to-air after-cooler or intercooler for cooling compressed air which is output from a compressor (which is in the form of a turbocharger) for combustion by the engine. The disclosed after-cooling system also includes a radiator for cooling a liquid coolant which is output from the after-cooler, a pump for pumping coolant through the system, an air temperature sensor for sensing the temperature of the compressed air after being cooled by the after-cooler, a coolant temperature sensor for sensing the temperature of the coolant output from the after-cooler, and a controller for controlling the flow-rate of coolant through the system in response to the sensed air and coolant temperatures. The cooling circuit of the Aihara et al. patent not only cools the after-cooler but also cools the compressor.

The Aihara et al. after-cooling system has several deficiencies, the most serious of which is that the controller of the system is able to stop the pump from supplying coolant to the after-cooler. Stopping the flow of coolant through the after-cooler would likely cause a failure of the after-cooler itself. The inlet and outlet of the after-cooler assembly of the Aihara et al. after-cooling system includes a cowl or duct so as to distribute the pressurised air on the inlet side of the after-cooler over the larger internal surface of the cores of the after-cooler. Even so, there is a hot-spot where the air blast of the compressed air hits the centre of the first after-cooler core. If the coolant is not moving through the core then no heat is able to be removed from the central area receiving the hot air blast. This central area will expand as it is heated. Because the surrounding structure of the after-cooler core is not subject to this hot-spot effect and no coolant is flowing, buckling and structural failure of the after-cooler core is likely to result. It is known that the portion of any after-cooler core subject to the initial air blast from the compressor is the area which erodes or fails first during service. Also, coolant will boil in the area of the hot-spot. Once this happens all cooling ability is lost, as air is induced into the system through boiling of the coolant and thus greatly reducing the ability of the coolant pump to operate properly. Air can become trapped within the system on the suction side of the pump and this can cause problems with the flow of coolant.

It would therefore be desirable to have an after-cooling system which is suitable for use with land-based engines such as land-based diesel engines.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying illustrations, wherein, by way of illustration and example, a preferred embodiment of the present invention is disclosed.

According to an aspect of the present invention there is provided an engine after-cooling system comprising an after-cooler for cooling compressed air which is output from a compressor for combustion by an internal-combustion engine, a heat exchanger for cooling a coolant which is output from the after-cooler, a pump for continuously pumping the coolant through the system, an outlet air temperature sensor for sensing the temperature of the compressed air after the compressed air is cooled by the after-cooler, a coolant temperature sensor for sensing the temperature of the coolant output from the after-cooler, and a controller for controlling the flow-rate of coolant through the system in response to the sensed air and coolant temperatures.

The after-cooling system may be employed with any suitable internal-combustion engine which may or may not be a de-rateable emission-controlled engine and which may or may not be installed on a vehicle. However, it is preferred that the after-cooling system is used with a de-rateable emission-controlled engine such as, for example, a de-rateable emission-controlled diesel engine.

The engine after-cooling system enables a de-rateable emission-controlled engine, such as, for example, a de-rateable emission-controlled diesel engine which uses the system, to maintain high power output levels in relatively high ambient temperatures without de-rating. The system also assists in decreasing the fuel consumption of such engines.

The after-cooling system may be used with any suitable internal-combustion engine such as, for example, a diesel, petrol, or gas-powered internal-combustion engine which employs any suitable compressor such as, for example, a turbocharger or a supercharger to compress inlet air prior to the air being combusted by the engine.

The after-cooling system according to the present invention has superior performance when compared with other engine after-cooling systems which are of a similar size. This makes the after-cooling system according to the present invention particularly suitable for use in situations where the space available to accommodate an engine after-cooling system is at a premium.

The after-cooling system is preferably independent of any other cooling systems such as engine cooling systems.

The after-cooler of the system may be of any suitable type. In a preferred form the after-cooler includes a pipe through which compressed inlet air from the compressor passes, and a plurality of cooling tubes located adjacent to the pipe so that heat is able to be transferred from the compressed inlet air to the coolant which passes through the cooling tubes. In a particular preferred form the after-cooler includes three cooling sections each containing a plurality of cooling tubes. Each cooling section has respective inlet and outlet ports.

Any suitable heat exchanger may be used in the system. For example, the heat exchanger may be a device for efficient heat transfer from one fluid to another, whether the fluids are separated by a solid wall so that they never mix, or the fluids are in direct contact with each other.

Suitable heat exchangers may include parallel-flow, cross-flow and counter-flow heat exchangers. In parallel-flow heat exchangers, the coolant and the heat exchange media enter the exchanger at the same end, and travel in parallel to one another to the other side. In counter-flow heat exchangers the coolant and the heat exchange media enter the exchanger from opposite ends. We have found that counter current design is most efficient, in that it can transfer the most heat. In a cross-flow heat exchanger, coolant and the heat exchange media travel roughly perpendicular to one another through or across the exchanger.

The heat exchanger maximizes the surface area between the coolant and the heat exchange media. Fins, corrugations or baffles increase surface area and may be used to induce lamella or turbulent flow. Double pipe or multiple pipe type heat exchangers may be used.

Suitable heat exchangers for use in the present invention include: liquid to gas; liquid to liquid; and gas to gas heat exchangers. Of the single phase heat exchangers, a shell and tube heat exchanger which consists of a series of finned tubes, through which one of the fluids flows may be used. The second fluid runs over the finned tubes to be heated or cooled.

Another suitable heat exchanger is a plate heat exchanger. It directs flow through baffles so that the fluids are separated by plates with very large surface area.

Advantageously, phase-change heat exchangers may also be used in the present invention. The use of coolants that undergo a phase change permit the heat exchange circuit to employ the latent heat of the coolant enabling a greater absorption and release of heat per unit volume of the coolant. Heat exchangers can be used either to heat a liquid to evaporate (or boil) it, or used as condensers to cool a vapour to condense it back to a liquid.

Air conditioning systems and refrigeration systems are preferred for use in the present invention for cooling the coolant. Air conditioning systems and refrigeration systems use heat exchange in their condensers to cool refrigerant vapour back to liquid in their refrigerant cycles. Air conditioning systems also have cooling coils which act as heat exchangers, not only cooling down air, but also condensing excess humidity from the air into liquid condensate.

Suitable coolants for use in heat exchangers include liquids such as water, ethylene glycol, or any other suitable liquid which may be applied to become a heat-carrying medium. Gases that may be used as coolants in the heat exchanger used in the present invention include air, $CO_2$, or any other suitable gas which may be used as a coolant.

Phase-change coolants for use in refrigeration and air conditioning systems may include ammonia, chlorofluorocarbons (e.g., R-11, R-12, R-22, R-134a, R-502), hydro-carbons, liquid petroleum gas, and the like.

If the coolant employed by the engine after-cooling system is a phase change coolant, it is preferred that the after-cooling system also includes an expansion valve for controlling the pressure of the phase change coolant. By controlling the pressure of the coolant, the expansion valve is also able to control the temperature of the coolant due to the relationship between pressure and temperature. The location of the valve is preferably such that the temperature and pressure of the coolant which is upstream of the expansion valve is greater than the temperature and pressure of the coolant which is located downstream of the valve. This allows for better heat transfer to and from the coolant due to larger temperature differentials, and may allow for the possibility of the after-cooler to cool the compressed air which passes through the after-cooler to a temperature which is lower than the ambient temperature.

In a particular preferred form, the heat exchanger is a liquid-to-air cooling radiator. The liquid-to-air cooling radiator may be of any suitable type. For example, the liquid-to-air cooling radiator may be of the type which includes any suitable number of vertically extending cooling tubes. In a preferred form, particularly useful in high temperature and/or high load applications, the radiator may be a triple-pass radiator having three sections that each include a plurality of horizontal cooling tubes.

Preferably, the cooling tubes of the first section extend from an inlet port of the radiator so that coolant can flow into the tubes of the first section through the inlet port. The cooling tubes of the second section are preferably located below the first section and are preferably connected to an opposite end of the first section to the inlet port so that coolant is able to flow from the tubes of the first section into the tubes of the second section in the opposite direction to the flow of coolant through the tubes of the first section. The cooling tubes of the third section are preferably located below the second section and are preferably connected to an opposite end of the second section to that which the tubes of the first section are connected to so that coolant can flow from the tubes of the second section into the tubes of the third section in the opposite direction to the flow of coolant through the tubes of the second section. The ends of the cooling tubes of the third section which are not connected to the tubes of the second section are preferably connected to an outlet of the radiator so that coolant can flow from the tubes of the third section and through the outlet. It is preferred that the radiator has horizontally extending cooling tubes because it has been found that such radiators are able to cool the coolant which flows through them more efficiently than radiators with vertical cooling tubes. It has also been found that a radiator with horizontally extending cooling tubes is less likely to have undesirable high temperature regions or "hot spots" form therein. The radiator may be of any suitable size and shape, and may be fabricated from any suitable material. Preferably, the radiator is fabricated from aluminium alloy.

A plurality of vertical cooling fins is preferably located adjacent the cooling tubes of the various sections of the radiator so that heat is able to be transferred from the coolant in the cooling tubes to the cooling fins, and then transferred to the air which flows past the cooling fins.

The radiator preferably has header tanks on the sides thereof. It is also preferred that the radiator includes a plurality of directional baffle plates in the header tanks for directing the flow of coolant into the various sections of the radiator.

It is preferred that the design of the radiator and the after-cooler are similar to each other.

The pump may be of any suitable type. For example, the pump may be a variable or constant flow-rate pump. If the pump is a variable flow-rate pump any suitable variable flow-rate pump, such as, for example, a vane-type pump having a positive displacement, may be used. In a particular preferred form, the flow-rate of the pump may be varied between 1 and 250 litres or 30 to 180 litres of coolant per minute. If the pump is a constant flow-rate pump any suitable constant flow-rate pump, such as, for example, a centrifugal pump may be employed. The pump is preferably includes and is driven by a hydraulic, pneumatic or an electric motor whose speed may or may not be varied. The pump may be of a type which is suitable for circulating a gas phase coolant through the system. For example, the pump may be a compressor.

It is preferred that the pump continuously pumps the coolant through the system while the engine is operating. It is particularly preferred that the pump continuously pumps the coolant through the system only while the engine is operating.

The pump preferably pumps coolant which has been cooled by the heat exchanger from the heat exchanger to the after-cooler.

The outlet air temperature sensor may be provided by any air temperature sensor which is suitable for sensing the temperature of the compressed air after the compressed air is cooled by the after-cooler. In a preferred form, the outlet air temperature sensor is in the form of an air temperature probe. The outlet air temperature sensor may be a remote sensor such as, for example, an infra-red sensor. The outlet air temperature sensor is preferably located immediately adjacent the outlet of the after-cooler from which the cooled compressed inlet air is output.

The coolant temperature sensor may be of any type which is suitable for sensing the temperature of the coolant which is output from the after-cooler. In a preferred form, the coolant temperature sensor is in the form of a temperature probe. For example, if the coolant which is used by the system is water, the temperature probe may be a water temperature probe. The coolant temperature sensor may be a remote sensor such as, for example, an infra-red sensor.

The controller may be of any type which is suitable for controlling the flow-rate of coolant through the system in response to the air and coolant temperatures which are sensed by the air and coolant sensors. In a preferred form the controller includes a hydraulic controller, a pneumatic controller or an electronic controller for controlling the speed of the pump to thereby control the flow-rate of the pump, and a programmable logic controller (PLC) or a computer for controlling the hydraulic controller, pneumatic controller or electronic controller in response to the sensed air and coolant temperatures.

The controller may control the flow-rate of coolant through the system in any suitable manner. Preferably, the controller controls the flow-rate of coolant through the system by controlling the rate at which coolant is pumped or circulated through the system by the pump, or in other words, by controlling the flow-rate of the pump. In another preferred form, the controller controls the flow-rate of coolant through the system other than by controlling the flow-rate of the pump. For example, the pump may be a constant flow-rate pump which continuously pumps the coolant through the system at a constant rate, and the system may include one or more bleed valves which are able to be controlled by the controller so as to decrease or increase the amount of coolant flowing through the system and thereby control the flow-rate of coolant through the system.

The engine after-cooling system preferably also includes an inlet air temperature sensor for sensing the temperature of the compressed air before the compressed air is cooled by the after-cooler. The controller may also control the flow-rate of coolant through the system in response to the temperature sensed by the inlet temperature sensor. The inlet air temperature sensor may be provided by any air temperature sensor which is suitable for sensing the temperature of the compressed air prior to the compressed air being cooled by the after-cooler. In a preferred form, the inlet air temperature sensor is in the form of an air temperature probe. The inlet air temperature sensor may be a remote sensor such as, for example, an infra-red sensor. The inlet air temperature sensor is preferably located immediately adjacent the inlet of the after-cooler to which the compressed air is input.

The after-cooling system preferably includes an ambient air temperature sensor for sensing the ambient temperature of the air in the vicinity of the system. The controller may also control the flow-rate of coolant through the system in response to the temperature sensed by the ambient air temperature sensor. The ambient air temperature sensor may be provided by any air temperature sensor which is suitable for sensing the temperature of the air in the vicinity of the system. In a preferred form, the ambient air temperature sensor is in the form of an air temperature probe. The ambient air temperature sensor may be a remote sensor such as, for example, an infra-red sensor. The ambient air temperature sensor is preferably located immediately adjacent the after-cooling system.

The controller preferably controls the flow-rate of the coolant through the system in response to the temperatures sensed by the outlet air temperature sensor, coolant temperature sensor, inlet air temperature sensor, and the ambient air temperature sensor.

In a particular preferred form, the controller determines the difference between the ambient air temperature sensed by the ambient air temperature sensor and the temperature sensed by the inlet air temperature sensor of the compressed air from the compressor (e.g. turbocharger or supercharger) which is input into the after-cooler prior to the compressed air being cooled or condensed by the after-cooler. The controller also preferably determines the difference between the ambient air temperature sensed by the ambient air temperature sensor and the temperature sensed by the outlet air temperature sensor of the compressed air output from the after-cooler. The controller preferably uses the difference between the ambient air temperature and the temperature of the compressed inlet air prior to being cooled by the after-cooler, the difference between the ambient air temperature and the temperature of the compressed inlet air output from the after-cooler, and the temperature of the coolant as sensed by the coolant temperature sensor to determine the appropriate flow-rate of the coolant through the system which will maintain the coolant temperature and thus the temperature of the compressed inlet air which is output from the after-cooler at an optimum temperature.

It is preferred that the controller controls the flow-rate of the coolant through the system in response to the difference between the temperatures sensed by the ambient air temperature sensor and the inlet air temperature sensor, the difference between the temperatures sensed by the ambient air temperature sensor and the outlet air temperature sensor, and the temperature sensed by the coolant temperature sensor. Preferably, the controller controls the rate at which the coolant is pumped through the system by the pump (i.e. the flow-rate of the pump) so that the flow-rate of the coolant through the system corresponds to the flow-rate which the controller determines will cause the coolant temperature to contribute to maintaining the compressed inlet air which is output from the after-cooler at an optimum temperature.

The engine after-cooling system preferably includes another coolant temperature sensor for sensing the temperature of the coolant which is input to the after-cooler. The controller may also control the flow-rate of coolant through the system in response to the temperature sensed by the additional coolant temperature sensor. The additional coolant temperature sensor may be of any type which is suitable for sensing the temperature of the coolant which is input to the after-cooler. In a preferred form, the additional coolant temperature sensor is in the form of a temperature probe. For example, if the coolant which is used by the system is water, the temperature probe may be a water temperature probe. The additional coolant temperature sensor may be a remote sensor such as, for example, an infra-red sensor.

The after-cooling system preferably includes a fan for forcing air through the heat exchanger to thereby assist the heat exchanger to cool the coolant which passes through the heat exchanger. The fan may be of any suitable type and may be a variable speed fan or a constant speed fan. The direction of rotation of the fan is preferably able to be varied. Preferably, the controller is able to control the speed or direction of rotation of the fan. In a particular preferred form, the controller is able to control the speed or direction of rotation of the fan in response to the sensed air and coolant temperatures.

It is preferred that the controller controls the speed of the fan in response to the temperatures sensed by the outlet air temperature sensor, coolant temperature sensor, inlet air temperature sensor, and the ambient air temperature sensor.

The controller preferably uses the difference between the ambient air temperature and the temperature of the compressed inlet air prior to being cooled by the after-cooler, the difference between the ambient air temperature and the temperature of the compressed inlet air output from the after-cooler, and the temperature of the coolant as sensed by the coolant temperature sensor to determine the appropriate fan speed which will assist the heat exchanger maintain the coolant temperature and thus the temperature of the compressed inlet air which is output from the after-cooler at an optimum temperature.

Preferably, the controller controls the fan so that the speed thereof corresponds to the fan speed which the controller determines will cause the coolant temperature to contribute to maintaining the compressed inlet air which is output from the after-cooler at an optimum temperature.

The optimum temperature of the compressed inlet air which is output from the after-cooler may be any suitable temperature. If the engine is a de-rateable engine, the optimum temperature of the compressed inlet air which is output from the after-cooler is preferably a temperature which prevents the engine from de-rating or a temperature which minimises the amount by which the engine de-rates its power output.

When using a liquid coolant, the after-cooling system preferably includes a manifold tank. The manifold tank may be of any suitable size and shape, and may be fabricated from any suitable material. The manifold tank is preferably connected to an output of the pump and to an inlet of the after-cooler. Such an after-cooling system also preferably includes a header tank. The header tank may be of any suitable size and shape, and may be fabricated from any suitable material. The header tank is preferably connected to the manifold tank.

It is preferred that the after-cooling system includes a coolant level sensor. The coolant level sensor may be of any suitable type. When using a liquid coolant, the coolant level sensor may be employed to sense the coolant level in the header tank.

The after-cooling system may include an expansion tank. The expansion tank may be of any suitable size and shape, and may be fabricated from any suitable material. The expansion tank is preferably connected to a header tank which allows any volume change in the coolant to be accommodated. This is particularly preferred when the coolant undergoes a phase change from gas to liquid and vice versa during the heat exchange process.

The after-cooling system including the heat circuit thereof which includes the after-cooler, heat exchanger, and pump, together with any piping or other conduit which may connect the various components together may be fabricated from any suitable material. In a preferred form, the heat circuit is fabricated from aluminium or aluminium alloy. The excellent thermal conductivity of aluminium and aluminium alloys enables temperature variations in the system to be relatively quickly detected by the controller so that the controller is able to respond to the detected variations shortly after they are established. This enables the controller to effectively control the system in real-time.

BRIEF DESCRIPTION OF THE ILLUSTRATIONS

In order that the invention may be more fully understood and put into practice, a preferred embodiment thereof will now be described with reference to the accompanying illustrations, in which.

DETAILED DESCRIPTION OF THE ILLUSTRATIONS

Figure 1:
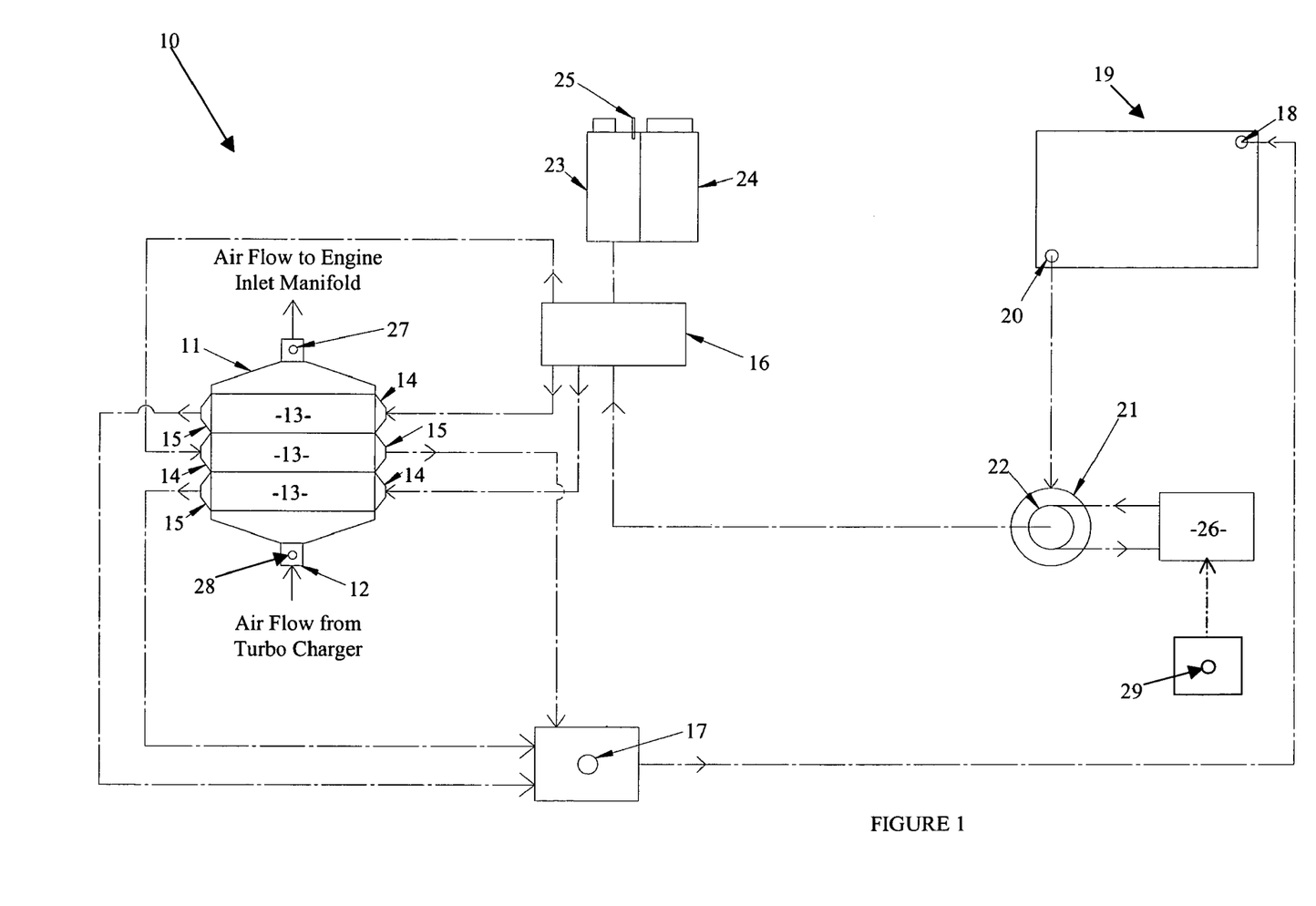
FIG. 1 is a schematic diagram of an engine after-cooling system according to a first preferred embodiment of the present invention.

Referring to FIG. 1, there is depicted an engine after-cooling system 10 according to a first preferred embodiment of the present invention. The system 10 is particularly suitable for use with a de-ratable emission-controlled diesel engine.

System 10 includes an after-cooler 11 for cooling compressed air which is output from a compressor such as the compressor section of a turbocharger or supercharger for combustion by an internal-combustion engine. After-cooler 11 includes a pipe 12 which is connected to the output of the compressor so that compressed inlet air which is output by the compressor passes through the pipe 12. After-cooler 11 also includes a plurality of sections 13 that each include a plurality of cooling tubes. The sections 13 are located adjacent the pipe 12 so that heat from the compressed air which passes through the pipe 12 is able to be transferred to a coolant which passes through the plurality of tubes in each section 13. Each section 13 has a respective inlet port 14 and a respective outlet port 15 so that coolant is able to flow into the sections 13 through their inlet ports 14 and out of the sections 13 through their outlet ports 15.

Each inlet port 14 of the after-cooler 11 is connected to a manifold tank 16 so that coolant is able to pass from the manifold tank 16 and into the sections 13 through the inlet ports 14.

Each outlet port 15 of the after-cooler 11 is connected to a coolant temperature sensor 17 so that coolant is able to flow from the sections 13 through the outlet ports 15 and pass through the temperature sensor 17 so that the sensor 17 is able to sense the temperature of the coolant which passes through it.

The coolant temperature sensor 17 is connected to an inlet port 18 of a heat exchanger 19 so that coolant which passes through the sensor 17 enters heat exchanger 19 through the inlet port 18. The cooled coolant then flows out of the heat exchanger 19 through an outlet port 20 which is located at the bottom of the heat exchanger 19.

The heat exchanger 19 may be any suitable type of heat exchanger. For example, the heat exchanger 19 may be a device for efficient heat transfer from one fluid to another, whether the fluids are separated by a solid wall so that they never mix, or the fluids are in direct contact with each other. More particularly, the heat exchanger 19 may be a parallel-flow, cross-flow or a counter flow heat exchanger. In the case where the heat exchanger 19 is a parallel-flow heat exchanger, the coolant and the heat exchange media enter the exchanger 19 at the same end, and travel in parallel to one another to the other side. In the case where the heat exchanger 19 is a counter-flow heat exchanger, the coolant and the heat exchange media enter the exchanger 19 from opposite ends. In the case where the heat exchanger 19 is a cross-flow heat exchanger, the coolant and the heat exchange media travel roughly perpendicular to one another through or across the exchanger 19.

The heat exchanger 19 increases the surface area between the coolant and the heat exchange media. The heat exchanger 19 may include fins, corrugations, baffles or other formations which function to increase the surface area and which may be used to induce lamella or turbulent flow. The exchanger 19 may be a multiple pipe type heat exchanger such as, for example, a double pipe heat exchanger.

The heat exchanger 19 may be a: liquid to gas; liquid to liquid; or a gas to gas heat exchanger. If the exchanger 19 is a single phase heat exchanger (e.g. a liquid to liquid, or a gas to gas heat exchanger), the exchanger 19 may be in the form of a shell and tube heat exchanger which includes a series of finned tubes, through which one of the fluids run. The second fluid may run over the finned tubes to be heated or cooled.

In another preferred form, the heat exchanger 19 is a plate heat exchanger. Such a heat exchanger directs flow through baffles so that the fluids are separated by plates with very large surface area.

Alternatively, the heat exchanger 19 may be a phase-change heat exchanger. The use of a coolant that undergoes a phase change would permit the heat exchanger 19 to employ the latent heat of the coolant enabling greater absorption and release of heat per unit volume of the coolant.

In yet another preferred form, the heat exchanger 19 may be a condensor which forms part of an air conditioning system or a refrigeration system which uses heat exchange in the condenser to cool refrigerant vapour back to liquid during a refrigeration cycle.

The coolant which is used by the system 10 may be a liquid such as, for example, water, ethylene glycol, or any other suitable liquid which may be applied to become a heat-carrying medium. Alternatively, the coolant may be a gas such as, for example, air, $CO_2$, or any other suitable gas which may be used as a coolant.

If the heat exchanger 19 forms part of an air conditioning system or a refrigeration system, the coolant is preferably a phase change coolant. Examples of phase change coolant which may be used include ammonia, chlorofluorocarbons (e.g., R-11, R-12, R-22, R-134a, R-502), hydro-carbons, liquid petroleum gas, and the like.

The outlet port 20 of the heat exchanger 19 is connected to an inlet port of a coolant pump 21. The coolant pump 21 is driven by a hydraulic, pneumatic or electric motor 22. Pump 21 is of a type which is able to continuously pump 1 to 250 litres or 30 to 180 litres of coolant per minute. An outlet port of the pump 21 is connected to the manifold tank 16, and the manifold tank 16 is connected to a header tank 23 so that coolant which is pumped out of the outlet port of the pump 21 accumulates in the manifold tank 16 and the header tank 23.

Header tank 23 is located adjacent to an expansion tank 24, and a coolant level sensor 25 senses the level of the coolant inside the header tank 23 for a management system. The coolant circulating within the system 10 can be replenished by topping-up the header and expansion tanks 23, 24.

A controller 26 controls the flow-rate of the pump 21 by controlling the speed of the motor 22 in response to the coolant temperature sensed by the coolant temperature sensor 17, the temperature of the compressed inlet air output from the after-cooler 11 as sensed by an outlet air temperature sensor 27, the temperature of the compressed inlet air prior to being cooled by the after-cooler 11 as sensed by an inlet air temperature 28, and the ambient air temperature sensed by an ambient air temperature sensor 29. In particular, the controller 26 controls the rate at which the pump 21 pumps (i.e. the flow-rate of the pump 21) coolant through the system 10 in response to the sensed coolant and air temperatures to maintain the cooled compressed inlet air which is output from the after-cooler 11 at an optimum temperature. The optimum temperature of the compressed air output from the after-cooler 11 may, for example, be a temperature which prevents the engine from de-rating or which minimises the amount by which the engine de-rates its output.

Controller 26 includes a programmable logic controller (PLC) or computer, and a hydraulic, pneumatic or electronic controller. The outputs of the coolant temperature sensor 17 and air temperature sensors 27 to 29 are connected to inputs of the PLC or computer. The PLC or computer then processes the air and coolant temperatures that are sensed by the sensors 17, 27, 28, and 29 and outputs a control signal for controlling the hydraulic, pneumatic or electronic controller. As part of the processing of the engine inlet air and coolant temperatures sensed by the sensors 17, 27, 28, and 29, the PLC or computer calculates the difference between the ambient air temperature sensed by the air temperature sensor 29 and the temperature of the inlet air to the after-cooler 11 as sensed by the air temperature sensor 28. Also, the PLC or computer calculates the difference between the ambient air temperature sensed by the inlet air temperature sensor 29 and the temperature of the outlet air from the after-cooler 11 as sensed by the inlet air temperature sensor 27. The PLC or computer uses these calculated temperature differentials and the coolant temperature sensed by the coolant temperature sensor 17 to determine the flow-rate of the pump 21 which will maintain the compressed inlet air which is output from the after-cooler 11 at or near the optimum temperature. The PLC or computer outputs control signals to the hydraulic, pneumatic or electronic controller for the pump 21 so that the flow-rate of the pump 21 is maintained at the flow-rate and speed as calculated by the PLC or computer. The hydraulic, pneumatic or electronic controller controls the speed of the hydraulic, pneumatic or electric motor 22 in response to the flow-rate control signal from the PLC or computer so that the flow-rate of the pump 21 (and therefore the flow-rate of coolant through the system 10) is maintained at the flow-rate calculated by the PLC or computer.

All of the components in the heat circuit including the after-cooler 11, heat exchanger 19, pump 21, and piping which connects the various components together are fabricated from aluminium or aluminium alloys. The excellent thermal conductivity of aluminium and aluminium alloys enables temperature variations in the system 10 to be relatively quickly detected by the controller 26 so that the controller 26 is able to respond to the detected variations shortly after they are established. This enables the controller 26 to effectively control the system 10 in real-time.

Figure 2:
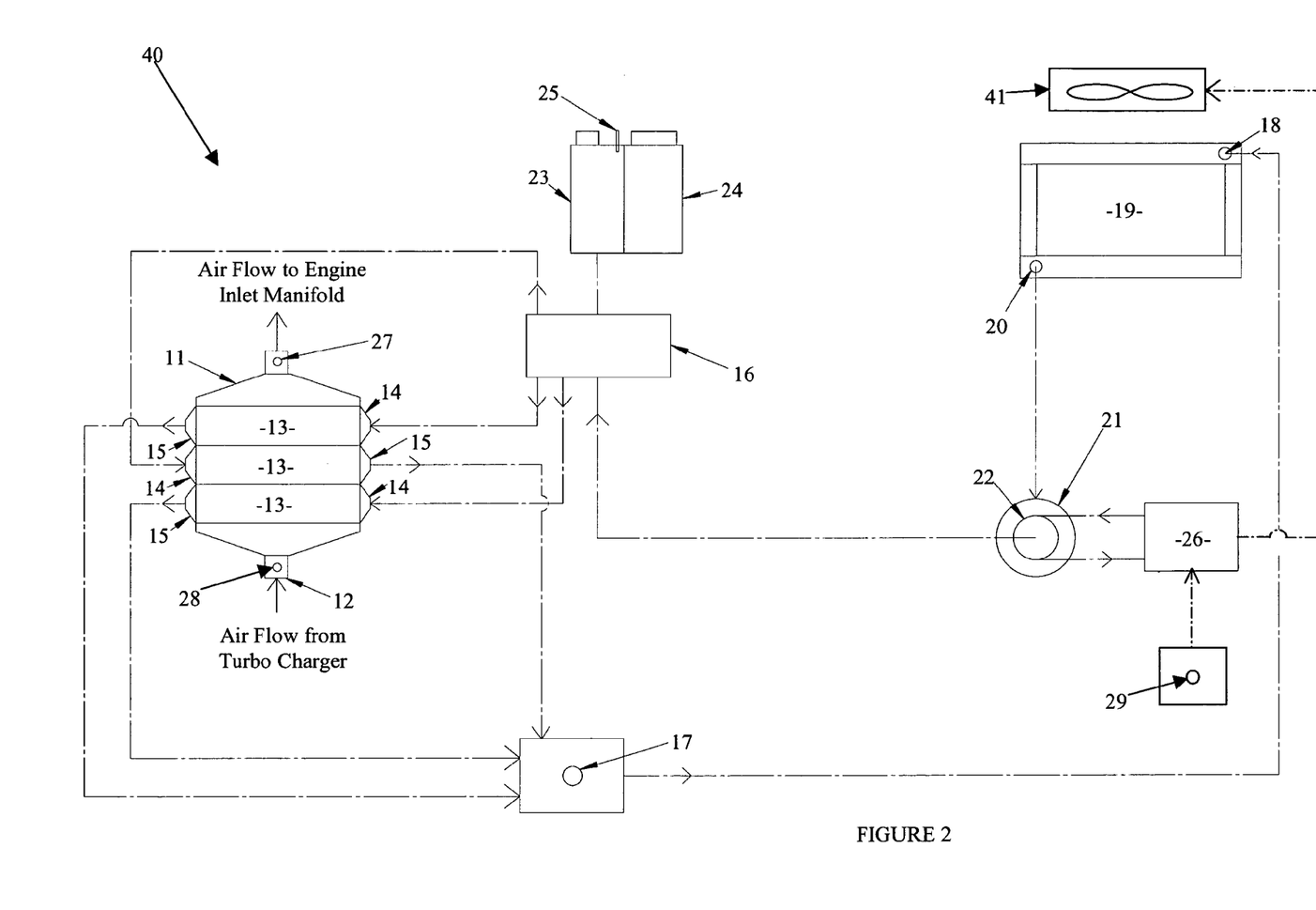
FIG. 2 is a schematic diagram of an engine after-cooling system according to a second preferred embodiment of the present invention.

Referring to FIG. 2, there is depicted an engine after-cooling system 40 according to a second preferred embodiment of the present invention. The system 40 is also particularly suitable for use with a de-retable emission-controlled diesel engine.

The system 40 is similar to the engine after-cooling system 10, and both systems share many features in common. For convenience, features which are common to the system 10 and the system 40 have been referenced using the same reference numerals.

The system 40 differs from the system 10 in that its heat exchanger 19 is a three-pass radiator which includes horizontal cooling tubes and an outlet port 20 as well as an inlet port 18 which is located at the top of the heat exchanger 19 and diagonally opposite the outlet port 20. Coolant which enters the heat exchanger 19 through the inlet port 18 passes through the horizontal cooling tubes of the radiator 19 so that heat from the coolant is transferred to the air which surrounds the tubes and is thereby removed from the coolant. The cooled coolant then flows out of the radiator 19 through an outlet port 20 which is located at the bottom of the radiator 19.

The heat exchanger 19 of the engine after-cooling system 40 is fitted with a variable speed fan 41 which is able to force air through the core of the heat exchanger 19 so that heat is transferred from the coolant passing through the heat exchanger 19 to the air which is forced through the heat exchanger 19 by the fan 41 so as to thereby cool the coolant.

In addition to using the calculated temperature differentials and the coolant temperature sensed by the coolant temperature sensor 17 to determine the flow-rate of the pump 21, the PLC or computer of the controller 26 of the system 40 also uses the calculated temperature differentials and the coolant temperature sensed by the coolant temperature sensor 17 to determine the speed of the fan 41 which will contribute to maintaining the compressed inlet air which is output from the after-cooler 11 at or near the optimum temperature. The controller 26 controls the speed of the fan 41 in response to the difference between the temperatures sensed by the ambient air temperature sensor 29 and the inlet air temperature sensor 12, the difference between the temperatures sensed by the ambient air temperature sensor 29 and the outlet air temperature sensor 27, and the temperature sensed by the coolant temperature sensor 17.

The PLC or computer of the system 40 is not only able to control the speed of the fan 41, it is also able to control the direction of rotation of the fan 41. The direction of rotation of the fan 41 is determined by parameters which are set in the PLC or computer of the controller 26.

Figure 3:
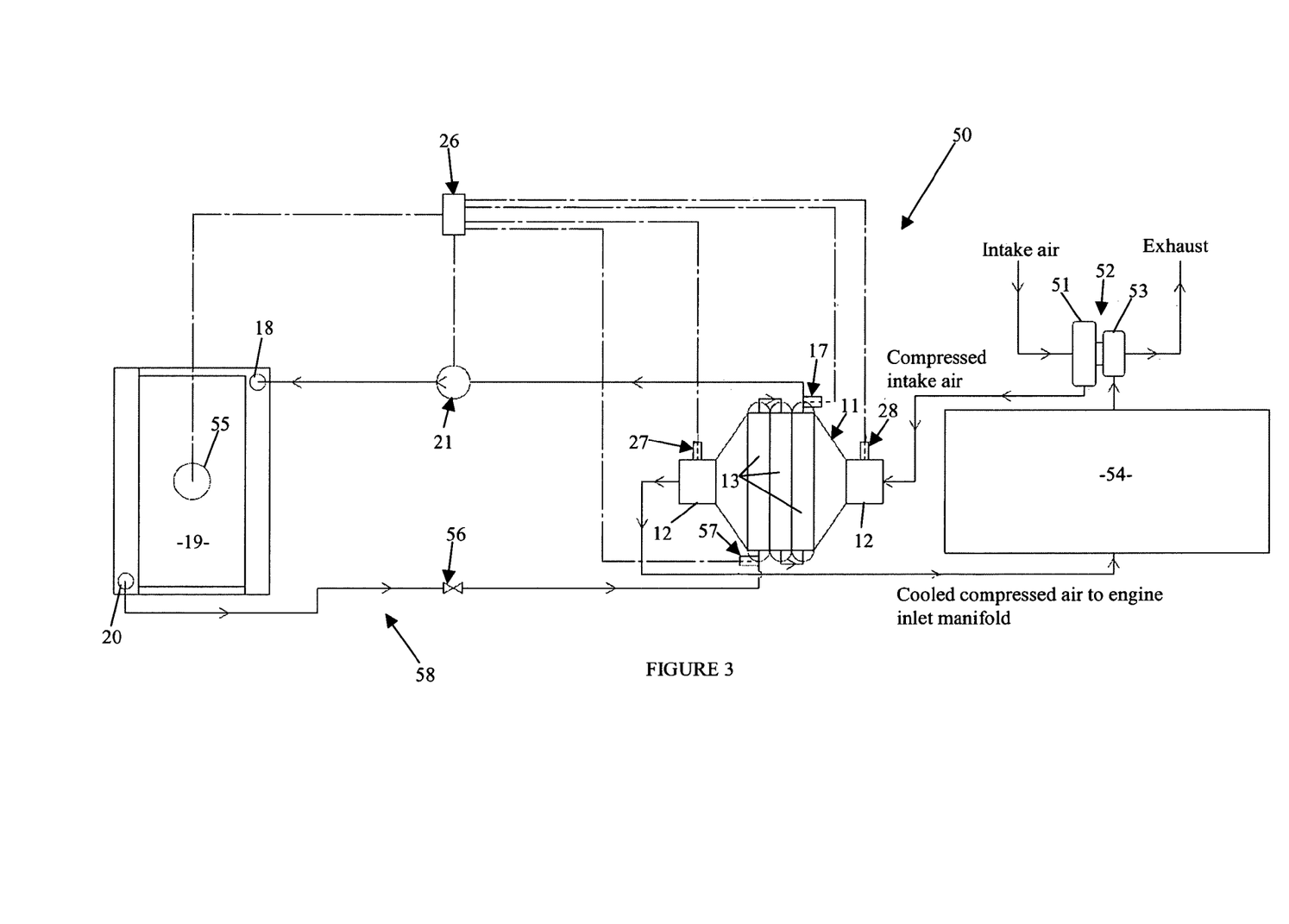
FIG. 3 is a schematic diagram of an engine after-cooling system according to a third preferred embodiment of the present invention.

Referring to FIG. 3, an engine after-cooling system 50 according to a third preferred embodiment of the present invention is similar to the after-cooler systems 10, 40. For convenience, like features of the systems 10, 40 and the system 50 have been referenced with the same reference numerals.

The after-cooler pipe 12 of system 50 is shown connected to the output of an air compressor section 51 of a turbocharger 52 which also includes a turbine section 53. The turbine section 53 includes a rotatable turbine (not depicted) which is coupled to a rotatable compressor impeller (not depicted) of the compressor section 51 such that rotation of the turbine causes the impeller to rotate. An inlet of the turbine section 53 is connected to the exhaust manifold of an internal combustion engine 54 so that all or some of the exhaust gases which are emitted by the engine 54 flow through the turbine section 53. As the exhaust gases flow through the turbine section 53 they cause the turbine which forms part of the turbine section 53 to rotate. This in turn causes the compressor impeller to rotate so that the impeller forces intake air through the compressor section 51 and compresses it. The process of compressing the inlet air is also referred to in the art as "charging" the inlet air. The compressed or charged air which is output from the compressor section 51 is fed to the after-cooler pipe 12 so that the compressed air is able to flow through the pipe 12.

As the compressed air from the turbocharger 52 passes through the after-cooler pipe 12, it is cooled by the coolant which flows through the after-cooler sections 13 which are located adjacent to the pipe 12. The coolant which is used in the after-cooler system 50 is a phase change coolant or refrigerant. Examples of phase change coolants or refrigerants which may be used may include ammonia, chlorofluorocarbons (e.g., R-11, R-12, R-22, R-134a, R-502), hydro-carbons, and the like.

The coolant is continuously pumped through the after-cooler 11 by the pump 21 of system 50. The pump 21 of system 50 is in the form of a compressor. The pump 21 also pumps the coolant through a heat exchanger 19 which is in the form of a condenser and which cools and condenses the coolant. The heat exchanger 19 includes a cooling fan (not depicted) which is rotated by a fan drive 55. Rotation of the fan by the fan drive 55 assists the heat exchanger 19 to cool and condense the coolant.

After leaving the heat exchanger 19, the coolant flows through an expansion valve 56 which controls the pressure of the coolant. By controlling the pressure of the coolant, the expansion valve 56 is also able to control the temperature of the coolant due to the relationship between pressure and temperature. The temperature and pressure of the coolant which is located upstream from the valve 56 is greater than the temperature and pressure of the coolant which is located downstream from the valve 56. This allows for better heat transfer to and from the coolant due to larger temperature differentials, and therefore allowing for the possibility of the compressed air which passes through the after-cooler 11 to be cooled to a temperature which is lower than the ambient temperature.

Valve 56 is connected to the after-cooler 11 so that the coolant which flows through the valve 56 is then able to flow through the sections 13 of the after-cooler 11.

The after-cooler pipe 12 is connected to the inlet manifold of the engine 54 so that the cooled compressed air which flows out of the pipe 12 flows into the inlet manifold where it can be mixed with fuel and then combusted by the engine 54.

A first coolant temperature sensor 17 of the after-cooler system 50 senses the temperature of the coolant which flows out of the after-cooler 11, and a second coolant temperature sensor 57 senses the temperature of the coolant which flows in to the after-cooler 11.

The controller 26 of the after-cooler system 50 controls the pump 21 and the fan drive 55 in response to the coolant temperatures sensed by the coolant temperature sensors 17, 57 as well as the air temperatures sensed by the air temperature sensors 27, 28. The air temperature sensors 27, 28 respectively sense the temperature of the compressed air which is output from the after-cooler 11, and the compressed air which is input to the after-cooler 11. In particular, the controller 26 controls the rate at which the pump 21 pumps coolant through the system 50 and the speed at which the fan drive 55 rotates the fan in response to the sensed coolant and air temperatures to maintain the cooled compressed inlet air which is output from the after-cooler 11 at a suitable temperature. The temperature may for example be a temperature which prevents the engine from de-rating or which minimises the amount by which the engine de-rates its output.

Sections 13, pump 21, condensor 19 and expansion valve 56 form a cooling circuit 58 of the after-cooling system 10. Cooling circuit 58 is similar to the cooling circuits which are used in refrigeration and air conditioning systems of the type which employ the so-called vapor compression refrigeration cycle.

Figure 4:
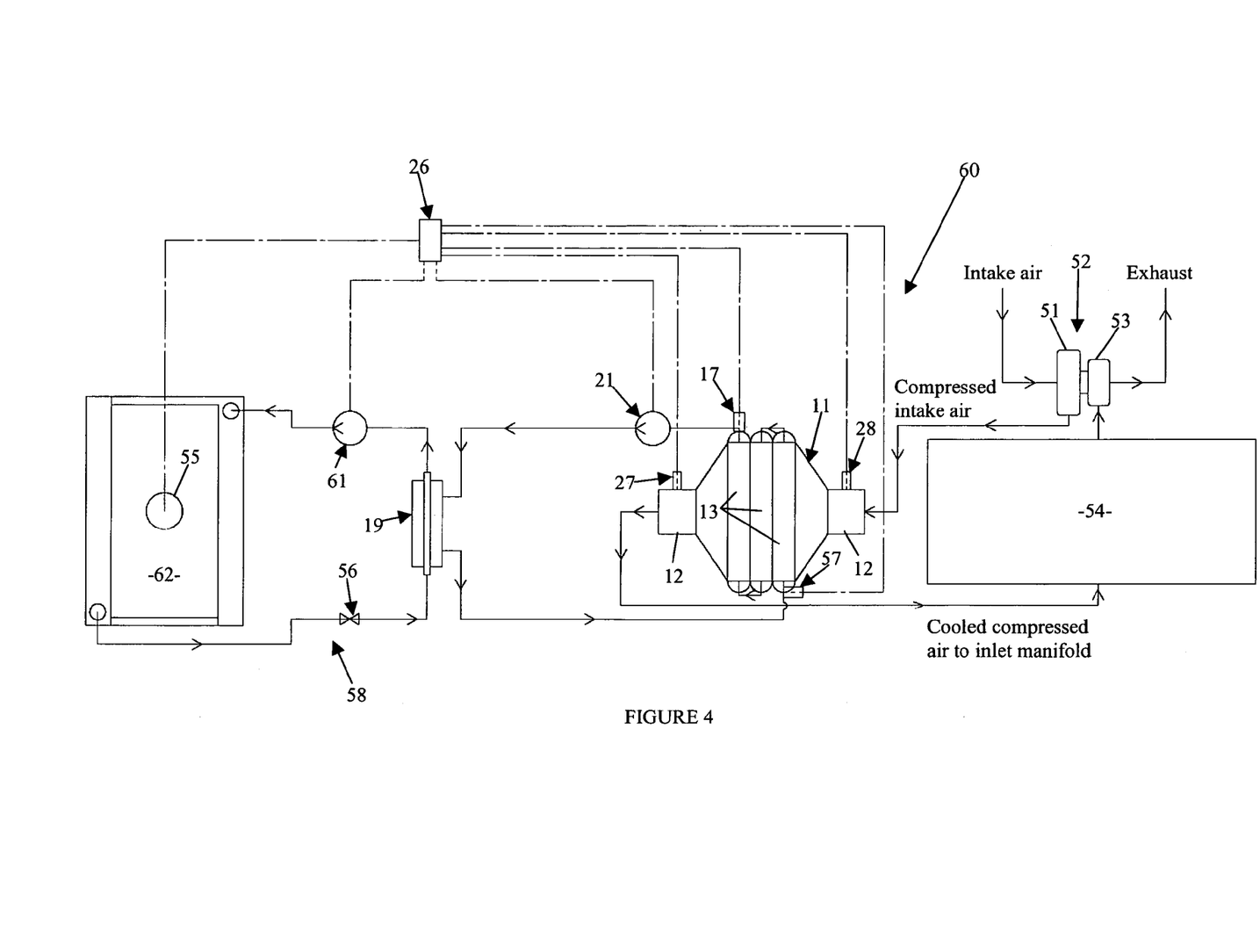
FIG. 4 is a schematic diagram of an engine after-cooling system according to a fourth preferred embodiment of the present invention.

Referring to FIG. 4, an engine after-cooling system 60 according to a fourth preferred embodiment of the present invention is similar to the after-cooler system 50 depicted in FIG. 3. For convenience, like features of the system 50 and the system 60 have been referenced with the same reference numerals.

System 60 differs from system 50 in that the coolant which flows through the after-cooler 11 of the system 60 is a liquid coolant rather than a refrigerant. Consequently, the pump 21 of the system 60 is a liquid coolant pump rather than a compressor. Pump 21 continuously pumps the coolant through the system 60. Also, the heat exchanger 19 of the system 60 is a counter-flow liquid-to-gas heat exchanger. As the coolant which flows out of the after-cooler 11 passes through the heat exchanger 19, the heat in the coolant is transferred by the heat exchanger 19 to a refrigerant which passes through the heat exchanger 19 in the opposite direction to the coolant and along a separate path from that along which the liquid coolant flows. A pump 61 which is in the form of a compressor continuously pumps the heated refrigerant through a separate heat exchanger 62 which is in the form of a condenser. The heat exchanger 62 cools and condenses the refrigerant as it flows through the heat exchanger 62. The heat exchanger 62 includes a cooling fan (not depicted) which is rotated by a fan drive 55. Rotation of the fan by the fan drive 55 assists the heat exchanger 62 to cool and condense the refrigerant.

After leaving the heat exchanger 62, the refrigerant flows through an expansion valve 56 and then back through the first heat exchanger 19 where it is again heated by the liquid coolant which flows through the heat exchanger 19.

The controller 26 of the after-cooler system 60 controls the pumps 21, 61 and the fan drive 55 of the after-cooler system 60 in response to the coolant temperatures sensed by the coolant temperature sensors 17, 57 as well as the air temperatures sensed by the air temperature sensors 27, 28. In particular, the controller 26 of the after-cooler system 60 controls: the rate at which the pump 21 pumps liquid coolant through the after-cooler 11 and first heat exchanger 19; the rate at which the pump 61 pumps refrigerant through the first heat exchanger 19 and the second heat exchanger 62; and the speed at which the fan drive 55 rotates the fan. The controller 26 controls the pumps 21, 61 and fan drive 55 so as to maintain the cooled compressed inlet air which is output from the after-cooler 11 at a suitable temperature.

Figure 5:
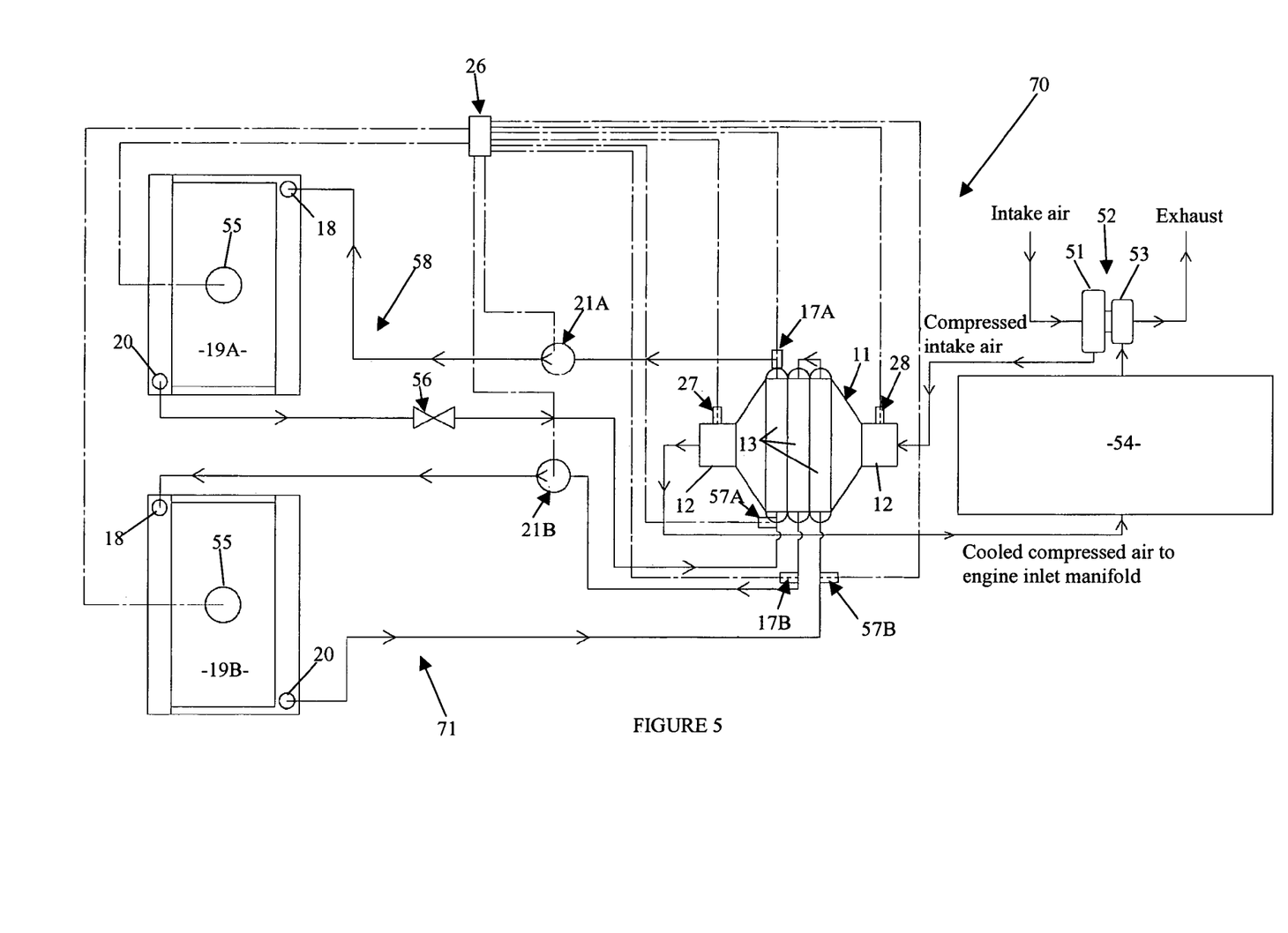
FIG. 5 is a schematic diagram of an engine after-cooling system according to a fifth preferred embodiment of the present invention.

Referring to FIG. 5, an engine after-cooling system 70 according to a fifth preferred embodiment of the present invention is based in part on the after-cooling system 50 depicted in FIG. 3. For convenience, like features of the system 70 and the system 50 have been referenced with the same reference numerals.

The after-cooling system 70 has a first cooling circuit 58 which employs a refrigerant as the coolant. Apart from the refrigerant of the circuit 58 flowing through only some of the sections 13 of the after-cooler 11, the circuit 58 has the same configuration as the cooling circuit of the after-cooling system 50. The first cooling circuit 58 includes a pump 21A in the form of a compressor, a heat exchanger 19A in the form of a condenser, and an expansion valve 56.

A first coolant temperature sensor 17A of the first cooling circuit 58 senses the temperature of the refrigerant coolant which flows out of the after-cooler 11, and a second coolant temperature sensor 57A of the first cooling circuit 58 senses the temperature of the refrigerant coolant as it flows into the after-cooler 11.

In addition to the first cooling circuit 58, the after-cooling system 70 also has a second cooling circuit 71 which uses a liquid coolant instead of a refrigerant. The second cooling circuit 71 is connected to the after-cooler 11 in parallel to the first cooling circuit 58 so that the liquid coolant of the second cooling circuit 71 flows through different sections 13 of the after-cooler 11 to those which the refrigerant of the first cooling circuit 58 flows through. The second cooling circuit 71 includes a pump 21B for pumping the liquid coolant through the circuit 71, and a heat exchanger 19B which is in the form of a radiator. The liquid coolant is cooled by the heat exchanger 19B as it passes through the heat exchanger 19B.

A first coolant temperature sensor 17B of the second cooling circuit 71 senses the temperature of the liquid coolant which flows out of the after-cooler 11, and a second coolant temperature sensor 57B of the second cooling circuit 71 senses the temperature of the liquid coolant as it flows into the after-cooler 11.

The controller 26 of the after-cooler system 70 controls the pumps 21A, 21B and the fan drives 55 of the heat exchangers 19A, 19B in response to the coolant temperatures sensed by the coolant temperature sensors 17A, 17B, 57A, 57B as well as the air temperatures sensed by the air temperature sensors 27, 28. In particular, the controller 26 of the after-cooler system 70 controls the rate at which the pumps 21A, 21B pump coolant through the after-cooler 11 and heat exchangers 19A, 19B, and it also controls the speed at which the fan drives 55 rotate the fans which are coupled to the fan drives 55. The pumps 21A, 21B and fan drives 55 are controlled so as to maintain the cooled compressed inlet air which is output from the after-cooler 11 at a suitable temperature.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

It will be clearly understood that, if a prior art publication is referred to herein, that reference does not constitute an admission that the publication forms part of the common general knowledge in the art in Australia or in any other country.

The invention claimed is:

1. An engine after-cooling system comprising an after-cooler for cooling compressed air which is output from a compressor for combustion by an internal-combustion engine, a heat exchanger for cooling a coolant which is output from the after-cooler, a pump for continuously pumping the coolant through the system, an outlet air temperature sensor for sensing temperature of the compressed air after the compressed air is cooled by the after-cooler, a coolant temperature sensor for sensing temperature of the coolant output from the after-cooler, and a controller for controlling a flow-rate of coolant through the system in response to the sensed air and coolant temperatures.

2. The engine after-cooling system of claim 1, wherein the after-cooler includes a pipe through which the compressed air passes, and a plurality of cooling sections located adjacent to the pipe.

3. The engine after-cooling system of claim 1, wherein the system further comprises an air conditioning or refrigeration system for cooling the coolant, wherein the air conditioning or refrigeration system includes the heat exchanger.

4. The engine after-cooling system of claim 1, wherein the system further comprises an expansion valve for controlling the pressure of the coolant.

5. The engine after-cooling system of claim 1, wherein the pump is a variable flow-rate pump.

6. The engine after-cooling system of claim 1, wherein the pump includes a hydraulic, pneumatic or an electric motor.

7. The engine after-cooling system of claim 1, wherein the pump is a compressor.

8. The engine after-cooling system of claim 1, wherein the pump operates continuously while the engine is operating.

9. The engine after-cooling system of claim 1, wherein the pump pumps coolant which has been cooled by the heat exchanger from the heat exchanger to the after-cooler.

10. The engine after-cooling system of claim 1, wherein the controller controls the flow-rate of coolant through the system by controlling the rate at which coolant is pumped or circulated through the system by the pump.

11. The engine after-cooling system of claim 1, wherein the system also comprises an inlet air temperature sensor for sensing temperature of the compressed air before the compressed air is cooled by the after-cooler, and wherein the controller also controls the flow-rate of coolant through the system in response to the air temperature sensed by the inlet air temperature sensor.

12. The engine after-cooling system of claim 1, wherein the system further comprises an ambient air temperature sensor for sensing ambient temperature of the air in the vicinity of the system, and wherein the controller also controls the flow-rate of coolant through the system in response to the temperature sensed by the ambient air temperature sensor.

13. The engine after-cooling system of claim 1, wherein the system also comprises an inlet air temperature sensor for sensing temperature of the compressed air before the compressed air is cooled by the after-cooler, and an ambient air temperature sensor for sensing the ambient temperature of the air in the vicinity of the system, and wherein the controller controls the flow-rate of the coolant through the system in response to the temperatures sensed by the outlet air temperature sensor, coolant temperature sensor, inlet air temperature sensor, and the ambient air temperature sensor.

14. The engine after-cooling system of claim 13, wherein the controller controls the flow-rate of the coolant through the system in response to a difference between the temperatures sensed by the ambient air temperature sensor and the inlet air temperature sensor, the difference between the temperatures sensed by the ambient air temperature sensor and the outlet air temperature sensor, and the temperature sensed by the coolant temperature sensor.

15. The engine after-cooling system of claim 1, wherein the system further comprises another coolant temperature sensor for sensing temperature of the coolant which is input to the after-cooler, and wherein the controller also controls the flow-rate of coolant through the system in response to the temperature sensed by the additional coolant temperature sensor.

16. The engine after-cooling system of claim 1, wherein the system further comprises a fan for forcing air through the heat exchanger.

17. The engine after-cooling system of claim 16, wherein the system also comprises an inlet air temperature sensor for sensing temperature of the compressed air before the compressed air is cooled by the after-cooler, and an ambient air temperature sensor for sensing ambient temperature of the air in the vicinity of the system, and wherein the controller controls the speed of the fan in response to the temperatures sensed by the outlet air temperature sensor, coolant temperature sensor, inlet air temperature sensor, and the ambient air temperature sensor.

18. The engine after-cooling system of claim 17, wherein the controller controls speed of the fan in response to the difference between the temperatures sensed by the ambient air temperature sensor and the inlet air temperature sensor, the difference between the temperatures sensed by the ambient air temperature sensor and the outlet air temperature sensor, and the temperature sensed by the coolant temperature sensor.

19. The engine after-cooling system of claim 1, wherein the system further comprises a manifold tank connected to the pump and the after-cooler.

20. The engine after-cooling system of claim 19, wherein the system further comprises a header tank connected to the manifold tank.

21. The engine after-cooling system of claim 20, wherein the system further comprises a coolant level sensor for sensing a level of coolant in the header tank.

22. The engine after-cooling system of claim 20, wherein the system further comprises an expansion tank connected to the header tank.

* * * * *